United States Patent [19]
Hershey et al.

[11] Patent Number: 6,108,524
[45] Date of Patent: Aug. 22, 2000

[54] INBOUND MESSAGING TRANSMISSION DEVICE AND SYSTEM FOR RAILCAR ASSET TRACKING USING HIGH FREQUENCY SIGNALING

[75] Inventors: John Erik Hershey, Ballston Lake; Howard LeRoy Lester, Alplaus; John Anderson Fergus Ross, Schenectady, all of N.Y.

[73] Assignee: General Electric Company, Schenectady, N.Y.

[21] Appl. No.: 09/027,493

[22] Filed: Feb. 20, 1998

[51] Int. Cl.[7] .................................................. H04B 17/00
[52] U.S. Cl. .......................... 455/67.1; 455/101; 455/507
[58] Field of Search .................................... 455/422, 507, 455/517, 101, 62, 67.1; 342/351, 357; 340/10.2, 825.49, 825.03

[56] References Cited

U.S. PATENT DOCUMENTS

| | | | |
|---|---|---|---|
| 5,203,012 | 4/1993 | Patsiokas et al. | 455/62 |
| 5,239,584 | 8/1993 | Hershey et al. | 380/28 |
| 5,588,005 | 12/1996 | Ali et al. | 342/357 |
| 5,917,433 | 6/1999 | Keillor et al. | 342/357 |

*Primary Examiner*—Nguyen Vo
*Assistant Examiner*—Marsha D. Banks-Harold
*Attorney, Agent, or Firm*—John F. Thompson; Jill M. Breedlove

[57] ABSTRACT

An asymmetrical (inbound only) high frequency communication system for asset tracking is made up of a message preparation and transmitter subsystem, a receiving subsystem, and a system monitoring subsystem. A transmission channel is selected randomly or pseudorandomly. Prior to each transmission, the transmitter performs a radiometric measurement of a selected channel. If the measurement exceeds a predetermined threshold, transmission in the selected channel is canceled and another channel is selected. The transmission protocol achieves frequency diversity by sequentially transmitting a message on a plurality of different channels. The receiving subsystem has a plurality of spatially separated receiver sites at various geographical points, thereby providing spatial diversity. The receiver sites are linked to a common processing center. Onboard the asset and collocated with the transmitter, a system monitoring subsystem records and stores parameters related to the message preparation and transmitter subsystem. These parameters are useful in assessing efficacy of transmission frequency planning algorithms and the transmission protocol.

4 Claims, 7 Drawing Sheets fig. 1 PRIOR ART fig. 2
PRIOR ART fig. 3
PRIOR ART fig. 4 fig. 5 fig. 6 fig. 7

INBOUND MESSAGING TRANSMISSION DEVICE AND SYSTEM FOR RAILCAR ASSET TRACKING USING HIGH FREQUENCY SIGNALING

BACKGROUND OF THE INVENTION

1. Field of the Invention

This invention relates to tracking of assets and, more particularly, to an asymmetrical high frequency (HF) messaging system used in the tracking of assets, including goods and vehicles.

2. Description of the Prior Art

U.S. Pat. No. 5,588,005 to Ali et al. describes the tracking of assets, including goods and vehicles, using the Global Positioning System (GPS). While goods are an example of assets that need to be tracked, the containers, container trucks and railcars in which the goods are shipped are themselves assets which need to be tracked, not just because of the goods they carry, but also because they represent capital assets typically of a leasing company not associated with the carrier.

The mobile tracking unit used in the Ali et al. system includes a navigation set, such as a Global Positioning System (GPS) receiver or other suitable navigation set, responsive to navigation signals transmitted by a set of navigation stations which can be either space- or earth-based. In each case, the navigation set is capable of providing data indicative of the vehicle location based on the navigation signals. In addition, the mobile tracking unit can include a suitable electromagnetic emitter for transmitting to a remote location the vehicle's position data and other data acquired with sensing elements in the vehicle.

There are two modes of communication for the asset tracking units. A first of these modes ("central station" communication) is that in which the communication is carried out between a central manager or station and the individual tracking units. This communication usually takes place through a satellite link. The second mode ("mutter mode" communication) is the local area network, referred to in the Ali et al. patent as the "mutter" mode, in which a subset of tracking units communicate with each other in a mobile dynamically configured local area network (LAN).

The first of these modes is the primary communication link for tracking the assets. Mutter mode communication is used as a secondary communication mechanism to conserve power. Ali et al. specify a protocol for mutter mode communication in their patent. The prime requirement of any protocol is that it be simple for implementation purposes and at the same time be robust under different failure modes. The protocol developed for the mutter mode makes use of the fact that there exists a two-way communication channel between the tracking units and the central station. Since the central station has use of a fairly powerful computer, the central station's processing power is used in setting up and maintaining the mutter mode network. This enables keeping the mutter mode protocol simple and reduces the complexity at individual tracking units which may number in the hundreds of thousands. In conjunction with the protocol for the central station communication, the protocol for mutter mode communication is very similar. The frame structure developed for the central station communication protocol can be used for the mutter mode communication as well. This further simplifies implementation of the mutter mode communication.

One of the options available for tracking railcars involves transmission of a high frequency signal from the tracked railcar. The high frequency (HF) spectrum, roughly 3 to 25 MHZ, may be used to successfully transmit a slow speed inbound (from the asset to a base) digital data stream. One available system depends upon there being an outbound (from the base to the asset) link for control. This complementary link infrastructure may be costly to establish and maintain. It would therefore be desirable to devise an asymmetrical system which uses an inbound link only with the possible addition of information provided to the asset by services such as the Global Positioning System (GPS) service.

SUMMARY OF THE INVENTION

An architecture for an asymmetrical (inbound only) high frequency (HF) communication system, as described herein, is capable of providing service significantly useful in the tracking of assets. The complexity of this system is considerably less than that of a symmetrical system. Adequate reliability of the system is assured by both incorporation of frequency and space diversity techniques.

The HF propagation regime is a classically difficult medium through which to communicate data reliably. The benefit to using the HF medium, however, is inherent in the physics that make the earth-ionosphere act as a waveguide for much of the HF spectrum much of the time. This often makes successful reception possible over very great distances with a small amount of transmitter power providing that numerous system components are properly chosen and integrated, of which not the least important or complex is the transmitting antenna.

The system of the invention is composed of three subsystems; a message preparation and transmitter subsystem, a receiving subsystem, and a system monitoring subsystem. The transmitter has two modes, a NORMAL mode used for transmissions which orginate, when a railcar is being tracked, outside a central station equipped railyard, and a SPECIAL mode used for communications that originate while the railcar is in the central station equipped railyard. A transmission channel is selected randomly or pseudorandomly. Prior to making a transmission, the transmitter performs a radiometric measurement of a selected channel. If the radiometric measurement exceeds a predetermined threshold, transmission in the selected channel is canceled and another channel is selected. In this way, the probability of interference to active users of the channel is reduced. The transmission protocol involves sequentially transmitting a message on a plurality of different channels, each randomly or pseudorandomly selected and radiometrically studied between a lowest usable frequency (LUF) and a maximum usable frequency (MUF), thereby providing frequency diversity. The receiving subsystem is made up of a plurality of spatially separated sites located at various points, such as within the 48 states of the contiguous United States, thereby providing spatial diversity. These sites are linked to a common processing center, which may be physically located at one of the receiver sites or at a separate location. The system monitoring subsystem is onboard the asset (the railcar, in this instance) and collocated with the transmitter. This subsystem records and stores parameters related to the message preparation and transmitter subsystem so that the collected data can be used to assess the efficacy of the frequency planning algorithms and the transmission protocol.

DETAILED DESCRIPTION OF A PREFERRED EMBODIMENT OF THE INVENTION

Figure 1:
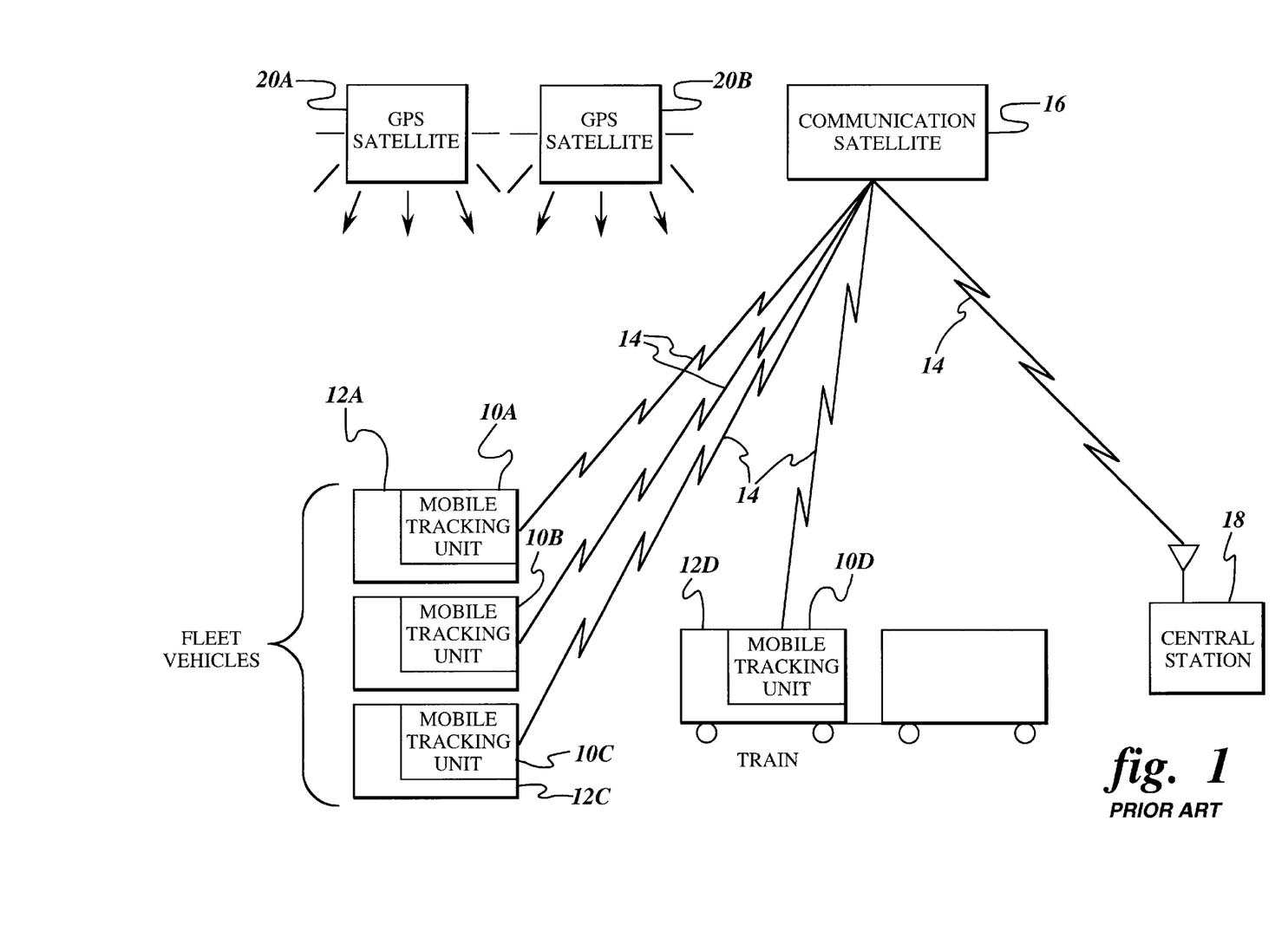
FIG. 1 is a block diagram of an exemplary asset tracking system which employs mobile tracking units.

FIG. 1 illustrates mobile tracking units using navigation signals from a GPS satellite constellation, although, as suggested above, other navigation systems can be used in lieu of GPS. A set of mobile tracking units 10A–10D are installed on respective vehicles 12A–12D which are to be tracked or monitored. A communication link 14, such as with a communication satellite 16, can be provided between each mobile tracking unit (hereinafter collectively designated as 10) and a remote central station 18 manned by one or more operators and having suitable display devices and the like for displaying location and status information for each vehicle equipped with a respective mobile tracking unit. Communication link 14 can be conveniently used for transmitting vehicle conditions or events measured with suitable sensing elements. Communication link 14 may be one-way (from mobile tracking units to central station) or two-way. In a two-way communication link, messages and commands can be sent to the tracking units, further enhancing reliability of the communication. A constellation of eighteen to twenty-one GPS satellites, represented here as GPS satellites 20A and 20B, provides global coverage for highly accurate navigation signals which can be used to determine vehicle position and velocity when acquired by a suitable GPS receiver. While only two satellites are shown, those skilled in the art will understand that at least four satellites of the constellation of satellites must be in view of the GPS receiver in order to obtain a GPS fix.

The GPS satellites, gradually placed into service throughout the 1980s by the U.S. Department of Defense, constantly transmit radio signals in L-Band frequency using spread spectrum frequency techniques. The transmitted radio signals carry pseudorandom sequences which allow users to determine location relative to the surface of the earth (within approximately 100 ft), velocity (within about 0.1 MPH), and precise time information. GPS is a particularly attractive navigation system to employ, being that the respective orbits of the GPS satellites are chosen so as to provide world-wide coverage.

Figure 2:
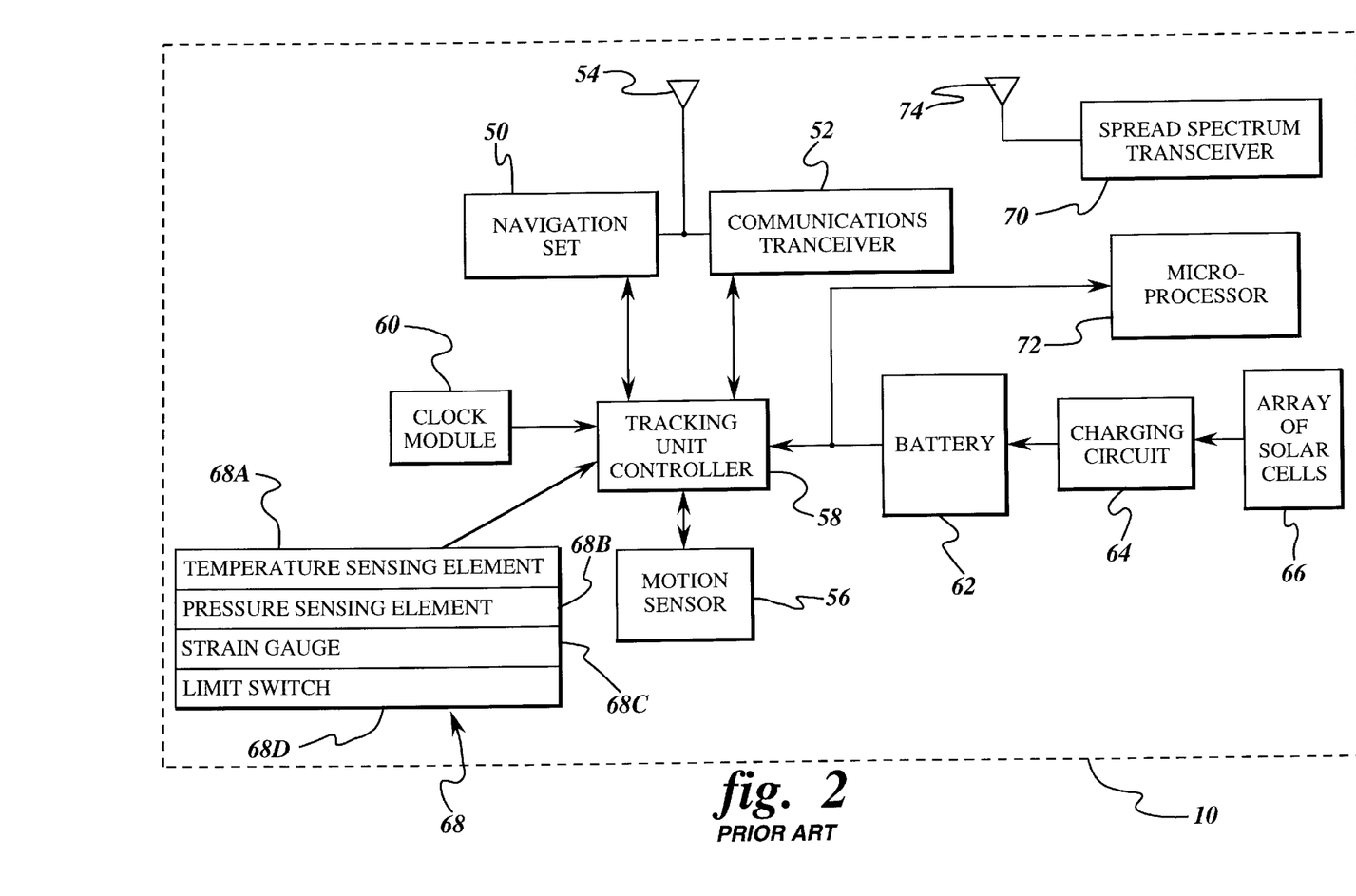
FIG. 2 is a block diagram showing, in further detail, a mobile tracking unit as used in the tracking system shown in FIG. 1.

FIG. 2 shows a mobile tracking unit 10 which includes a navigation set 50 capable of generating data substantially corresponding to the vehicle position. The navigation set is chosen in accordance with the particular navigation system used for supplying navigation signals to a given mobile tracking unit. Preferably, the navigation set is a GPS receiver such as a multichannel receiver. Alternatively, other receivers designed for acquiring signals from a corresponding navigation system can be employed. For example, depending on the vehicle position accuracy requirements, the navigation set can be chosen as a Loran-C receiver or other such less highly-accurate navigation receiver than a GPS receiver. Further, the navigation set can conveniently comprise a transceiver that inherently provides two-way communication with the central station and avoids the need for separately operating an additional component to implement such two-way communication. Briefly, such transceiver would allow for implementation of the previously mentioned satellite range measurement techniques being that the vehicle position is simply determined at the central station by range measurements to the vehicle and the central station from four satellites whose position in space is known. In each instance, the power consumed by the navigation set imposes a severe constraint for reliable and economical operation of the mobile tracking unit in assets which do not have power supplies, such as shipping containers, railcars used for carrying cargo and the like. For example, typical GPS receivers currently available consume as much as two watts of electrical power. In order to obtain a position fix, the GPS receiver must be energized for some minimum period of time to allow the receiver to acquire sufficient signal information from a given set of GPS satellites to generate a navigation solution. A key advantage of this system is the ability to minimize the overall power consumption of the mobile tracking unit by selectively reducing the activation or usage rate for the navigation set and other components of the mobile tracking unit. In particular, if when the vehicle is stationary, the activation rate for the navigation set is reduced, then the overall power consumption of the mobile tracking unit can be substantially reduced, for example, by a factor of at least one hundred.

Mobile tracking unit 10 includes a suitable transceiver 52 functionally independent from the navigation set. Transceiver 52 is optional, depending on the particular design implementation for the tracking unit. For example, if the navigation set comprises a transceiver, then transceiver 52 would be redundant. Transceiver 52 is capable of transmitting the vehicle position data by way of communication link 14 (FIG. 1) to the central station. If a GPS receiver is used, the GPS receiver and the transmitter can be conveniently integrated into a single unit for efficient installation and operation. A single, low profile antenna 54 can be conveniently used for both GPS signal acquisition and satellite communication.

A low power, short distance radio link is employed between multiple location/tracking units to hold down power consumption and increase reliability and functionality of the tracking system. In addition to a power source, a GPS receiver, a communications transceiver, and various system and vehicle sensors as shown in FIG. 2, each tracking unit includes a low power local transceiver 70 and a microprocessor 72. Although not specifically shown, microprocessor 72 is interfaced to all of the other elements of the unit and has control over them. Transceiver 70 may be a commercially available spread spectrum transceiver such as those currently utilized in wireless local area networks. The signals are broadcast over an antenna 74.

Figure 3:
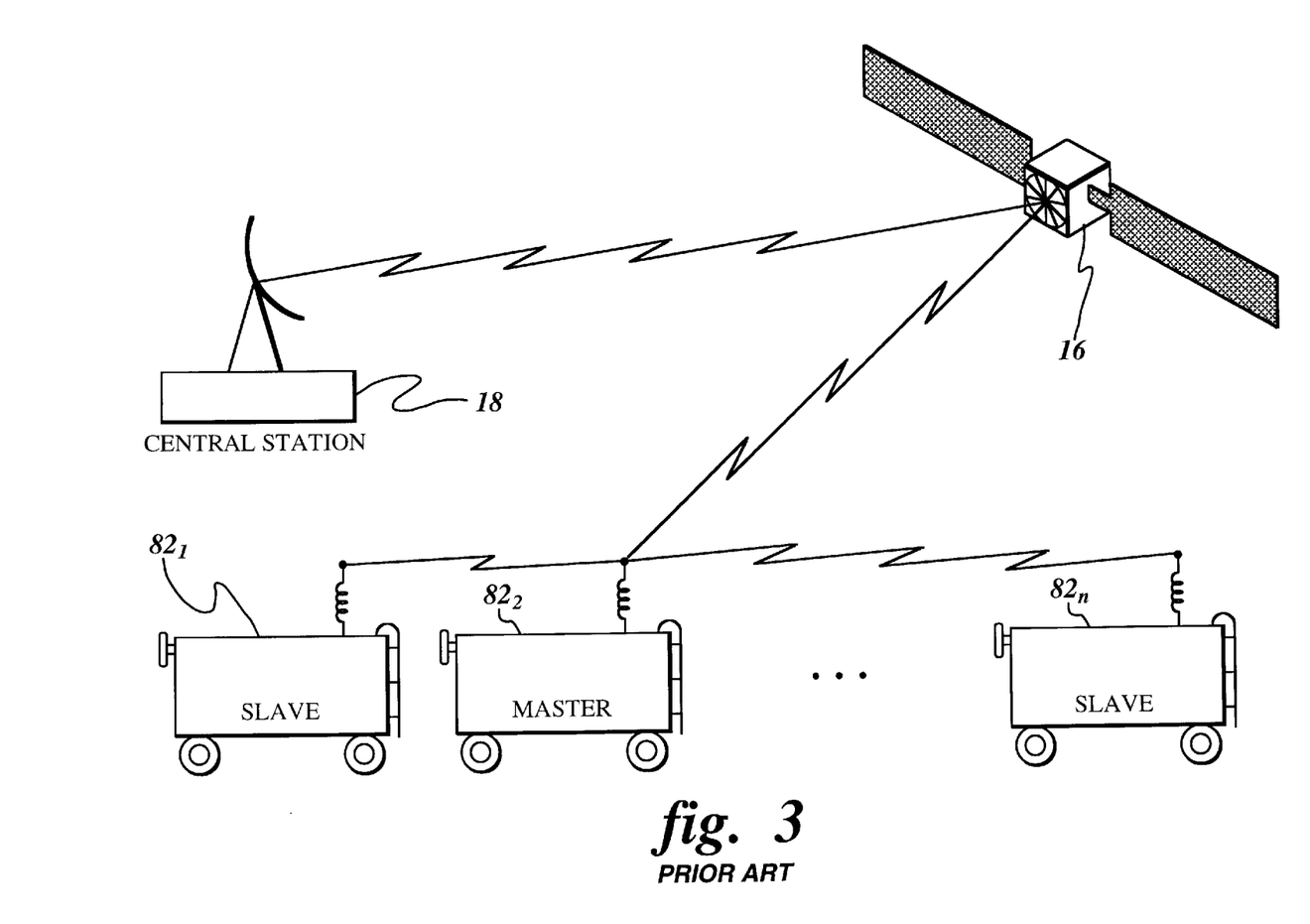
FIG. 3 is a block diagram illustrating the organization of the mobile local area network implemented in the tracking system shown in FIG. 1.

Utilizing local transceiver 70, microprocessor 72 communicates with all other tracking units within communications range. When a train has multiple freight cars $82_1, 82_2, \ldots, 82_n$ equipped with these tracking units as shown in FIG. 3, all of these units can exchange information. The exchanged information allows the cars to recognize that they are all part of the same train. Because the microprocessors are interfaced to their own respective power sources, the status of available power for each tracking unit can also be exchanged. Once this information is exchanged, the tracking unit with the most available power (i.e., most fully charged batteries) becomes the designated master, the other units being slaves. This master tracking unit performs the GPS position and velocity reception and processing function, assembles these data along with the identities (IDs) of all other tracking units on the train, and transmits this information periodically in a single packet to central station 18 via communication satellite 16.

To implement the protocol in this system, a two-way communication link between the communication satellite and the asset tracking units is first established. This depends upon the access method, which is chosen to be a Time Division Multiple Access (TDMA) protocol. The TDMA protocol requires each tracking unit to transmit in an assigned time-slot during which no other unit transmits. A TDMA system requires tracking units to be time synchronized to prevent collisions. This can be done using GPS absolute time as a reference, or it can be initiated by the central station using a broadcast control channel which is time synchronized to the communication traffic channel. The tracking units can synchronize to the control channel and hence derive synchronization to the traffic channel. The various units are also assigned transmission frequencies and time slots by the central station.

At this juncture, the tracking units will transmit on the assigned frequency and time slot. The data sent will comprise the unit ID, its location (as derived from GPS or equivalent) and battery strength. The tracking unit can decode the GPS data and forward location information with its ID and battery strength. Alternatively, the tracking unit can avoid decoding the GPS data and forward the raw received data, in which case, the raw data together with the unit ID and battery strength are sent. This latter mode may be viewed as a store and forward mode. However, in order to maintain data integrity, a fairly high oversampling rate must be used, which increases the data rate at a cost of requiring more power on the satellite link. Thus there is trade-off between GPS processing power required at the tracking unit and power required over the satellite traffic channel. The main advantage of the store and forward mode is that it requires less hardware in the tracking unit.

The central station receives the data from the various tracking units, decodes the information, and stores the decoded information in a table. Each row of the table has at least four entries: unit ID, location, battery strength and signal quality. Signal quality can be received signal strength, bit error rate measured over a known sync word or carrier to interference ratio. The table is sorted by location, and all tracking units within a predetermined proximity are grouped together to form a so-called "mutter" group. Next, a "best" tracking unit (i.e., the one with the most available power) is chosen from each group, and the central station informs that unit of its new role. The best tracking unit serves as the master mutterer and collects data from each of the members of its group which have likewise been informed of their new role by the central station via the satellite link. The collected data are then transmitted by the master mutterer via satellite link to the central station. This saves power as other units in the group, especially ones with low battery power, do not have to transmit except after long intervals.

Figure 4:
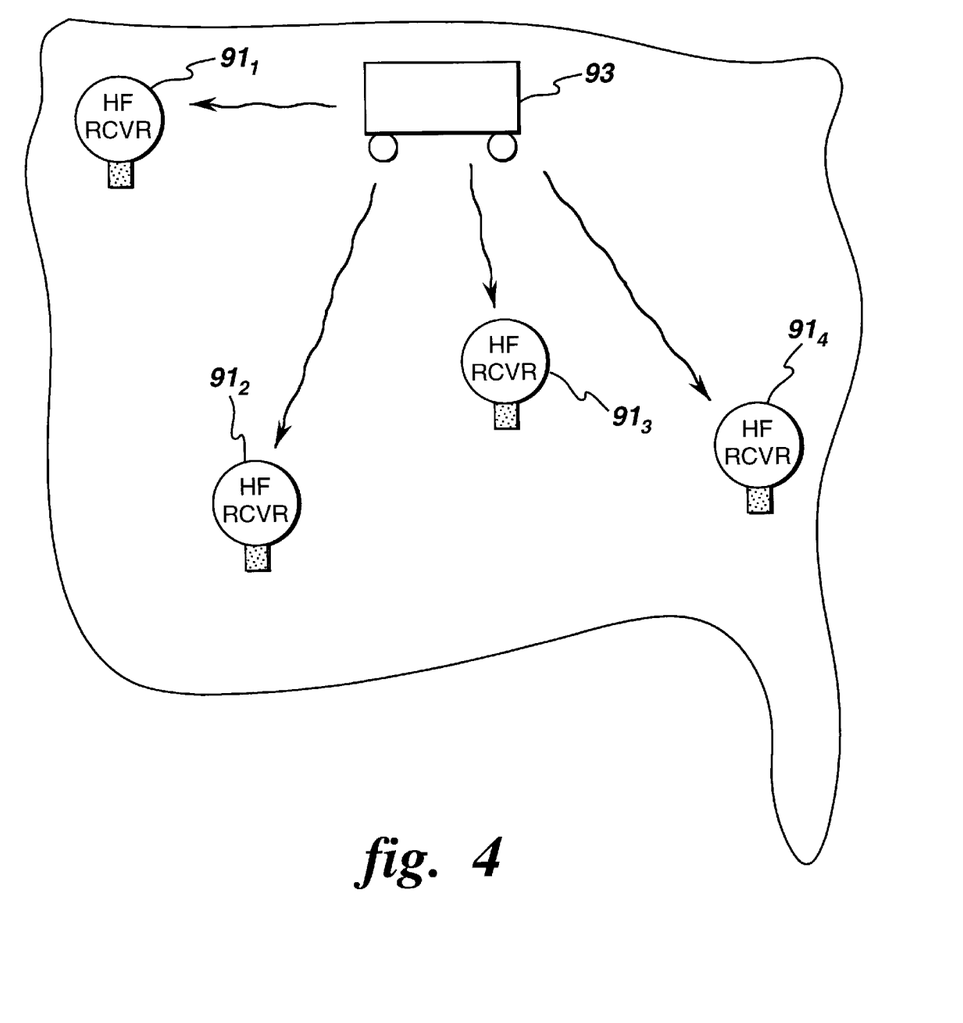
FIG. 4 is a geographical diagram illustrating the architecture of the asymmetrical (inbound only) high frequency messaging system for railcar assets according to the present invention.

The architecture of the asymmetric (inbound only) HF messaging system according to the present invention is depicted in FIG. 4. A plurality of linked HF receiver sites 91$_1$, 91$_2$, 91$_3$, and 91$_4$ are located throughout a defined geographic region. This system is intended to service railcar assets, represented by railcar 93, dispersed throughout the 48 contiguous United States with possible expansion to all of North America.

Designing this system requires the proper definition, realization and integration of several elements for which invention is indicated. These elements include:

the message preparation and transmitter subsystem, the receiving subsystem, and the system monitoring subsystem.

The messages are short, conveying an information content of up to a few hundred bits. The messages are provided Forward Error Correction (FEC) coding. This coding may be FEC coding specified in the Military Standard MIL-STD-188-110A published Sep. 30, 1991 for "Interoperability and Performance Standards for Data Modems" or it may be the "Random Parity Check" coding as developed from the encoding scheme reported in "Random Parity Coding (RPC)" by John Hershey and Jerome Tiemann, published in the 1996 IEEE *International Conference on Communications Conference Record,* Vol. 1, pp. 122–126. The messages may be afforded cryptographic protection by use of a private, one-key cryptographic system such as the Data Encryption Standard (DES). An algorithm based on the DES algorithm is taught, for example, in U.S. Pat. No. 5,239,584 to J. E. Hershey et al. for "Method and Apparatus for Encryption/Authentication of Data in Energy Metering Applications". Other such systems are well known in the art.

The signaling waveform preferably occupies 3 kHz of the HF band. The signal will be that described in (Military Standard) MIL-STD-188-110A, supra, or a modified version thereof. In particular, the preferred embodiment implements the following modifications to the Military Standard:

The "Serial (single-tone) mode" is used as set out in Section 5.3.2 of the Military Standard. Signaling is at the rate of 2400 symbols per second.

The "Fixed-frequency mode" as set out in Section 5.3.2.1 of the Military Standard is used.

The Military Standard modulation/modem is used in simplex (transmit only) mode-one-way non-reversible; i.e., see Section 5.3.2.2.1.b of the Military Standard.

In Forward Error Correction (FEC) bypass mode, as set out in Section 5.3.2.3.2.c of the Military Standard, Random Parity Coding (RPC) may be used as an input. In this option, 4800 bps can be delivered, including a very significant overhead of the RPC code used.

In the preferred embodiment, the transmitter has a NORMAL mode and a SPECIAL mode. NORMAL mode is used for transmissions originating from a railcar outside of a central station equipped railyard. The SPECIAL mode may be used for communications that originate while the car is in a central station serviced railyard. This SPECIAL mode is a low power mode, as a central station equipped railyard will have HF antennas on site along with dedicated receivers. The transmitter will switch to the SPECIAL mode (1) in the presence of a special low power signal transmitted in the yard by the central station or (2) upon determination of its presence in a central station equipped yard by comparing its GPS derived position estimate to a stored table of central station equipped sites. (The frequency plan and transmission protocol for the SPECIAL mode may be different from the frequency plan and transmission protocol for the NORMAL mode.)

The normal transmission protocol is a contention type protocol. A transmitter picks a time to transmit at random and transmits without benefit of a common message acknowledgment channel. The transmission times may or may not be slotted, depending on whether common timing information is provided to the transmitter by an ancillary system such as the GPS. Slotted operation invests the messaging system with a higher capacity.

The frequency plan is devised to serve two goals. The first is to reduce the probability of interference to active users of a specific 3 kHz channel. The second goal is to provide a high probability of successful error free message transport. The first goal is achieved by having the transmitter perform a simple radiometric measurement of the selected 3 kHz channel prior to transmission. If the radiometer output exceeds a predefined threshold, transmission at that 3 kHz channel is canceled at that time and another channel is chosen. This simple technique helps alleviate interference events caused by this messaging system. It is not foolproof, however, as a nearby station may be interfered with if that nearby station is attempting to receive a distant and weak transmission. Because of the random channel selection mechanism and the short duration of transmitted messages, however, interference events will be sufficiently rare and of such short duration that they can be tolerated. Additionally, provisions are made so that specific areas of the HF spectrum may be intentionally avoided.

The transmission protocol involves sequentially transmitting a message on a plurality (typically three) of different 3 kHz channels. These channels are each randomly or pseudorandomly chosen, and then radiometrically studied, from three contiguous but non-overlapping frequency ranges. The purpose of this redundancy is to greatly improve the probability of successful error free message transport by selecting a frequency for transmission that will (1) lie between the LUF (lowest usable frequency) and the MUF (maximum usable frequency) and (2) experience only nominal interference from other HF sources, both natural and non-natural. The combination of frequency diversity, transmitting on three channels, and the spatial diversity of the plurality of linked HF receiver sites, provides a useful one way (inbound) messaging system of reasonable reliability.

An alternative strategy would be to cycle through the asset numbers and allow them to transmit as in a time division multiple access (TDMA) scheme. The timing could be provided through GPS or similar service. Viability of this strategy would depend upon many factors such as the symbol transmit rate and acceptable system latency. This strategy would eliminate the possibility of system self-interference.

As stated above, channel selection may be random or pseudorandom. In pseudorandom selection, the selection may be driven by a geographically based selection procedure guided by a position estimate, including date and time, provided by the GPS or other position location estimation system.

Message Preparation and Transmitter Subsystem

Figure 5:
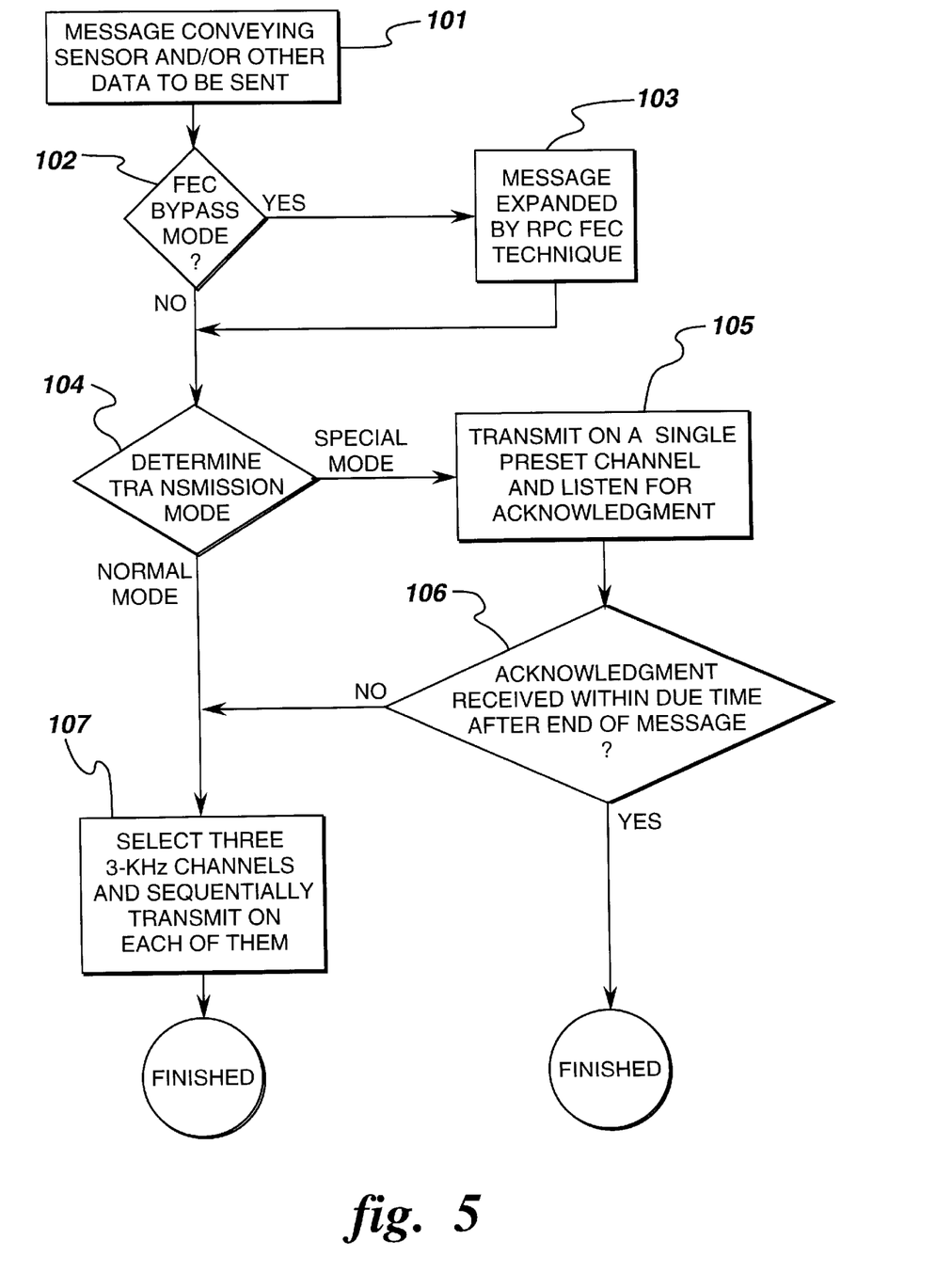
FIG. 5 is a flow diagram of the process of message preparation at the transmitter subsystem of the invention.

The logic flow is illustrated in FIG. 5. At step 101, a message is delivered to the message preparation component to be sent. A test is made at decision step 102 to determine if the subsystem is operated in the FEC bypass mode. If the subsystem is not operated in the FEC bypass mode, the message is converted by the process specified in the Military Standard, supra, to a message containing extra bits. The extra bits are used for FEC purposes. If the system is operated in the FEC bypass mode, the message may be protected by a specified FEC scheme such as Random Parity Coding (RPC) at step 103. This scheme is useful for combating extremely noisy channel effects.

The converted message is now ready for transmission. A test is made at decision block 104 to determine the mode of transmission. As mentioned above, the SPECIAL mode is a low power mode, used when the transmitter's host vehicle (e.g., railcar) is in or sufficiently near to a railyard or other location equipped to receive and process the HF communications. The transmitter subsystem component determines whether or not it can use this low power mode by either comparing its present geographic position, obtained via an on-board geopositioning device such as one responsive to the GPS, against a stored table of such locations or by listening for a special low power signal transmitted at the specially equipped railyard. This arrangement is somewhat similar to the practice of providing highway advisory broadcasts by using low power transmitters at the low end of the commercial broadcast AM band. If the SPECIAL mode cannot be used, the transmitter subsystem component defaults to the NORMAL mode which requires a higher transmitter power.

If in the SPECIAL mode, the message is transmitted at step 105 on a single preset channel. If the SPECIAL mode is attempted and an acknowledgment received within due time, as determined at decision step 106, the transmission cycle is completed. If the acknowledgment is not forthcoming within due time, or if the SPECIAL mode is not attempted, then the transmission is attempted by NORMAL mode.

In the NORMAL mode, the transmitter subsystem component determines by table lookup at step 107 what the Lowest Usable HF Frequency (LUF) and the Maximum Usable HF Frequency (MUF) are for the approximate time of day and divides up the bandwidth between the LUF and the MUF into a plurality, typically three, of approximately equal and contiguous non-overlapping segments. The transmitter subsystem component then randomly selects a 3 kHz channel from each of the three segments between the LUF and the MUF and radiometrically measures the power in each of the channels. If the measured power is above a preset threshold, another 3 kHz channel is selected within the same segment and the new channel radiometrically studied. This process is continued until there are three acceptable 3 kHz channels available or the algorithm exceeds a preset number of trials in which case the best channels in each segment, i.e., the ones which have the least interfering power, become the default choices.

Figure 6:
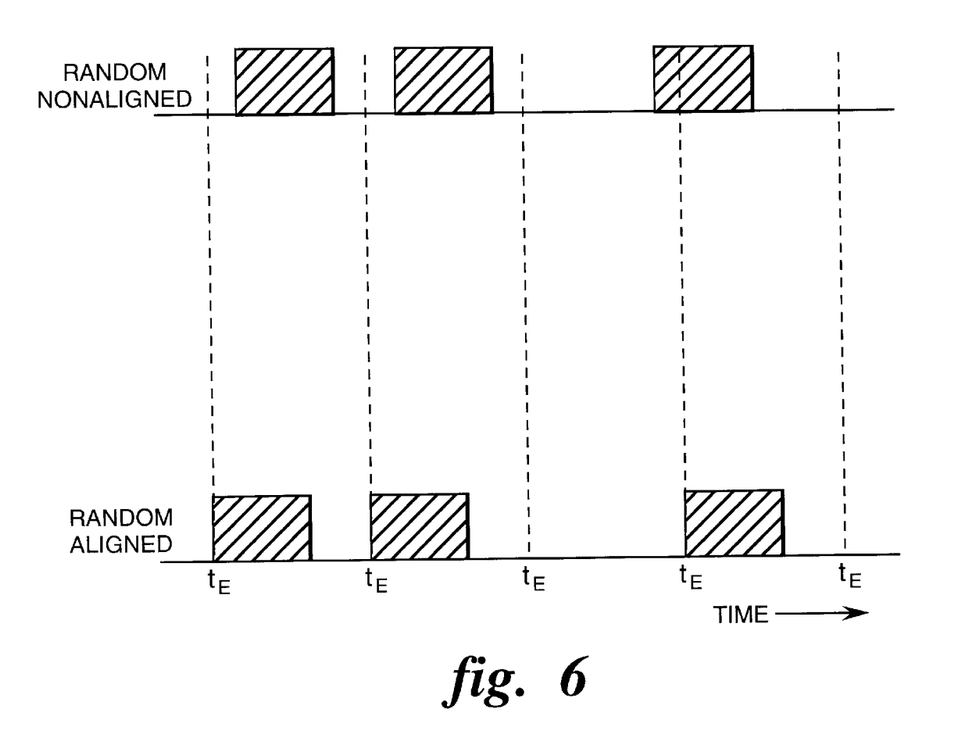
FIG. 6 is a timing diagram illustrating epoch timing in the practice of the invention.

The transmitter subsystem component then transmits the message in each of the three channels. The transmissions are non-overlapping in time and the times between start and stop of the three messages are random, with the possible exception that the start times may be picked to coincide with a periodic epoch according to GPS time transfer if available. (This practice is similar to "slotted ALOHA" without acknowledgment.) FIG. 6 illustrates this concept. More particularly, FIG. 6 depicts randomly generated transmissions that are initiated at any time (top pulses) and randomly generated transmissions that are required to align their start times (bottom pulses) with a periodic "epoch" or periodic time marker $t_E$. Such a relatively mild constraint, known in the art under the generic name of "Slotted ALOHA", has a great benefit on the innate capacity of the randomly accessed channel as originally taught by Norman Abramson and described in "The ALOHA System", *Computer-Communications Networks*, Abramson and Kuo, Editors, Prentice-Hall, 1973, pp. 501–515. The signaling waveform is that described in (Military Standard) MIL-STD 188-110A, supra, or a modified version thereof. The transmissions are simplex; i.e., there is no acknowledgment provided to the transmitter subsystem component.

Receiving Subsystem

The receiving subsystem consists of a plurality of spatially separated sites located at various points within the 48 states of the contiguous United States, as generally illustrated in FIG. 4. These sites are linked to a common processing center (i.e., central station) which may be physically located at one of the receiver sites or at a separate location. The information from all the receiver sites is fused at the common processing center and the recovered messages appropriately logged and forwarded out of the message system from the center. That is, the central station combines the different information from the plurality of receiver sites to produce a better estimate or reconstruction of the broadcast message.

Figure 7:
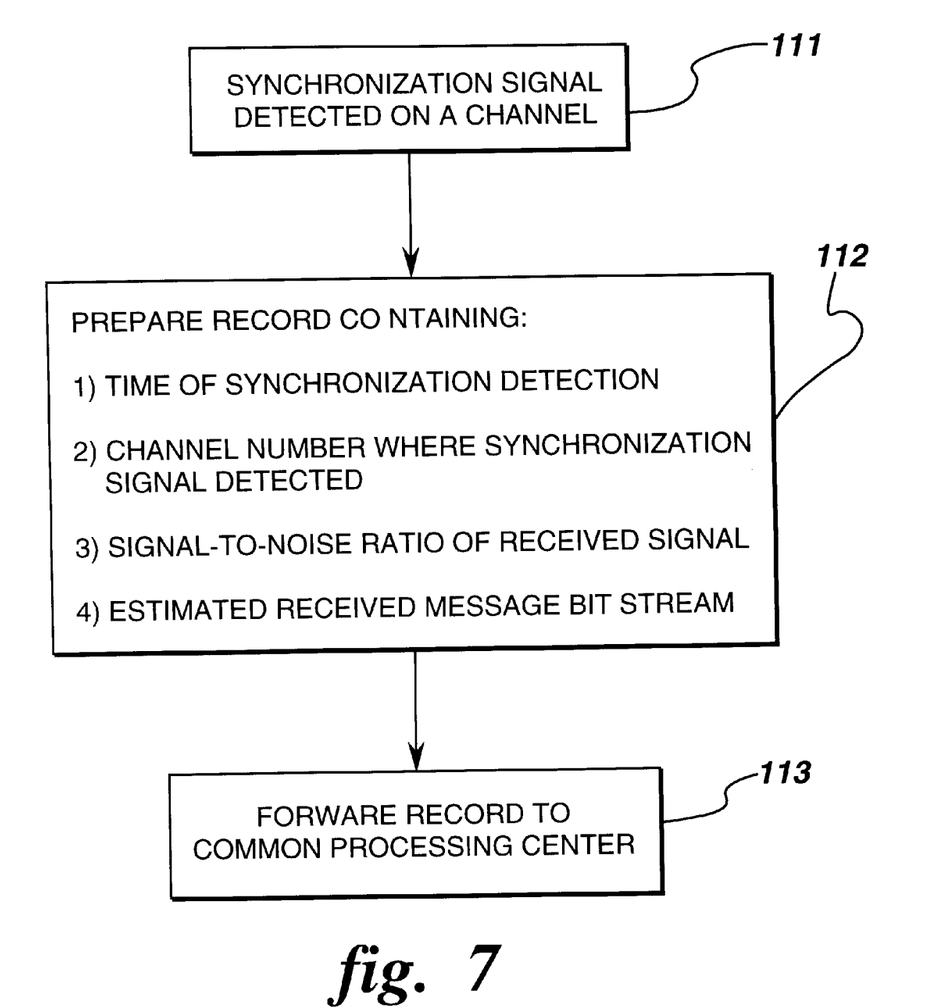
FIG. 7 is a flow diagram of the process at the receiving subsystem of the invention.

The process at the receiving subsystem is shown in FIG. 7. The process begins at step 111 by detecting a synchronization signal on a channel. The receivers use modem and signal processing techniques, such as parallel processing of the digital channelization of the receivers' intermediate frequencies (IFs) and interference mitigation techniques. Each receiver site that detects and decodes an incoming message prepares a record at step 112 that contains the time of message start (synchronization detection), channel number, signal-to-noise (S/N) ratio of the received signal, and the raw message bits, i.e., without FEC decoding performed. Each receiver forwards this information to a common or centralized processing center at step 113. The common or centralized processing center aligns or overlays in time the different receptions of the same message and forms a weighted estimate of the message bits. Although the weighting may be done in a number of ways, the preferred embodiment is to perform maximal ratio combining which is well known in the art.

System Monitoring Subsystem

The system monitoring subsystem is onboard the asset and collocated with the transmitter. This subsystem records and stores parameters related to the message preparation and transmitter subsystem so that these data can be used to assess the efficacy of the frequency planning algorithms and the transmission protocol and also to monitor health of the individual message preparation and transmitter subsystems. The system monitoring subsystem is a recorded data file of the essential parameters associated with each attempted transmission in the NORMAL transmission mode. For each transmission in this mode, the system monitoring subsystem creates and records the following essential elements of information:

the three channels chosen, the radiometer levels measured in the three chosen channels, and the time and start of transmission in the first of the three channels.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. An asymmetrical high frequency communication system for tracking an asset comprising:

a message preparation and transmitter subsystem onboard the asset for selecting a predetermined number of different transmission channels randomly or pseudorandomly and performing radiometric measurements on each of the selected channels and, for those channels where a radiometric measurement exceeds a predetermined threshold, randomly or pseudorandomly selecting an alternative channel and performing a radiometric measurement, and thereafter sequentially transmitting a message on the selected channels and any selected alternative channels, thereby providing frequency diversity; and a receiving subsystem responsive to said message preparation and transmitter subsystems and having a plurality of spatially separated receiver sites located at various geographical points so as to provide spatial diversity; and a common processing center, said sites being linked to said common processing center.

2. The asymmetrical high frequency communication system for tracking an asset recited in claim 1 further comprising a system monitoring subsystem onboard the asset and collocated with the message preparation and transmitter subsystem for recording and storing parameters related to the message preparation and transmitter subsystem so that the stored parameters can be used to assess the efficacy of frequency planning algorithms and a transmission protocol employed by the message preparation and transmitter subsystem.

3. A method for tracking an asset comprising the steps of:

selecting, at the asset, a predetermined number of different high frequency transmission channels randomly or pseudorandomly;

performing radiometric measurements on each of the selected channels and, for each of said channels where a radiometric measurement exceeds a predetermined threshold, performing a radiometric measurement on an alternative channel selected randomly or pseudorandomly;

sequentially transmitting a message on the selected different high frequency transmission channels for which said radiometric measurements do no exceed siad predetermined threshold, thereby providing frequency diversity; and receiving the transmitted message at a plurality of spatially separated receiver sites located at various geographical points, thereby providing spatial diversity, said receiver sites being linked and having a common processing center.

4. The method for tracking an asset recited in claim 3 further comprising the steps of:

recording and storing parameters related to each message transmission attempted at the asset; and accessing said parameters at a later time to assess efficacy of frequency planning algorithms and a transmission protocol employed in the sequential transmission of said message on the selected different high frequency transmission channels.

* * * * *